No. 700,898. Patented May 27, 1902.
E. J. CLARK.
ELECTRODE FOR ELECTRIC ACCUMULATORS.
(Application filed Jan. 6, 1902.)
(No Model.)
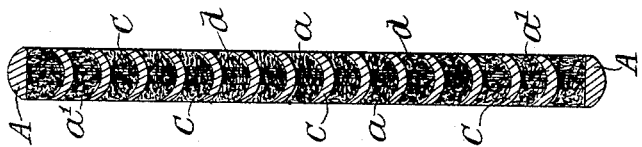
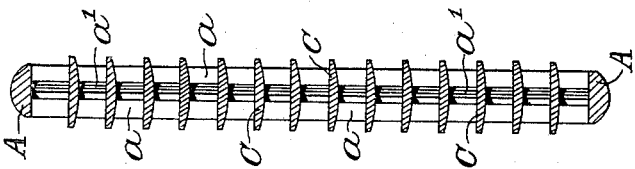
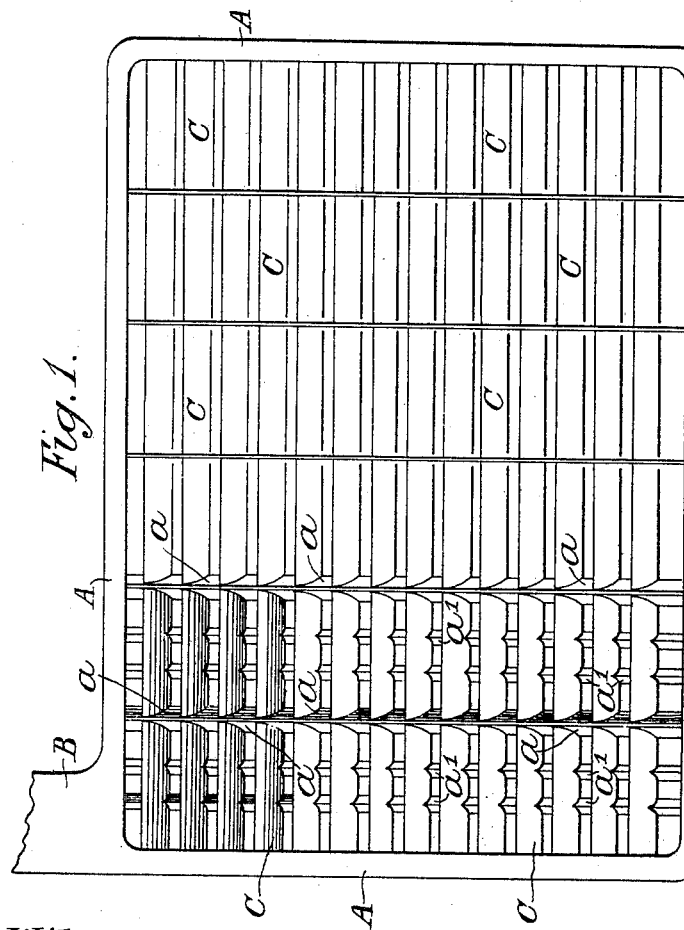
Witnesses:
E. Seavey
Therrett Towle
Inventor
Edward J. Clark
by W. H. Babcock
Attorney

UNITED STATES PATENT OFFICE.

EDWARD JAMES CLARK, OF STRATFORD, ENGLAND.

ELECTRODE FOR ELECTRIC ACCUMULATORS.

SPECIFICATION forming part of Letters Patent No. 700,898, dated May 27, 1902.

Application filed January 6, 1902. Serial No. 88,559. (No model.)

*To all whom it may concern:*

Be it known that I, EDWARD JAMES CLARK, electrical engineer, a subject of the King of Great Britain and Ireland, and a resident of No. 1 Marshgate Lane, Stratford, in the county of Essex, England, have invented certain new and useful Improvements in Grids or Plates for Secondary Batteries, of which the following is a specification.

My invention relates to a new or improved grid or plate forming an electrode of a secondary battery, and has for its objects to provide, in the first instance, a cast grid formed within a chill or recticulated mold, which after the process may be rolled to close the cup-like cells, hereinafter to be shown and described, and, secondly, to provide that the vertical bars between the outer frames shall maintain the normal position of the plate or electrode even under excessive discharge of a short-circuit, and "buckling" or disintegration of the oxid is thus obviated.

In order that my invention may be clearly understood, I have appended the accompanying drawings, in which—

Figure 1 is a front elevation of the plate or electrode without the active material. Fig. 2 is a vertical section thereof prior to rolling. Fig. 3 is a similar vertical section, showing the active material in place after rolling. Fig. 4 is a horizontal section of Fig. 1, taken just above any one of the troughs; and Fig. 5 is a plan of Fig. 1.

In carrying my invention into practice I employ a frame A with connecting-lugs B, preferably cast in a chill, with alternate vertical bars $a\ a'$, supporting lateral troughs C of cup, V, or channel-like shaped formation. Before the active material $d$ has been pasted into the interstices of the plate, grid, or electrode the same is subjected to a pressure by rollers or the like, thus closing the troughs C, Fig. 3, and producing perfect cohesion between the plate, grid, or electrode and the active material when pasted thereupon. Hence the structure of the plate A with a transverse-curved bar C, intersected by a rectangular longitudinal bar $a\ a'$, is sufficiently strong to withstand the buckling or surface curvature common to a high discharge upon accumulators as hitherto made and used, and the closing process prevents disintegration of the active material and also consolidates the plate or grid.

I do not confine myself to the use of pure lead as a basis of the plate, grid, or electrode, but may use any suitable alloy; also, as an active material any form of plumbic oxid.

Having now particularly described and ascertained the nature of my said invention and in what manner the same is to be performed, I declare that what I claim is—

An accumulator-plate, consisting of a frame, a series of vertical rods crossing the same, a series of trough-shaped horizontal plates practically integral with said rods and a mass of plumbic oxid held by said trough-shaped plates, the latter being rolled into said shape on said oxid, thereby compressing and holding the latter substantially as set forth.

In testimony whereof I have affixed my signature in presence of two witnesses.

EDWARD JAMES CLARK.

Witnesses:
WM. O. BROWN,
EDMUND S. SNEWIN.